2 Sheets—Sheet 2.
M. LANSBURGH.
Filtering Apparatus.
No. 223,741. Patented Jan. 20, 1880.
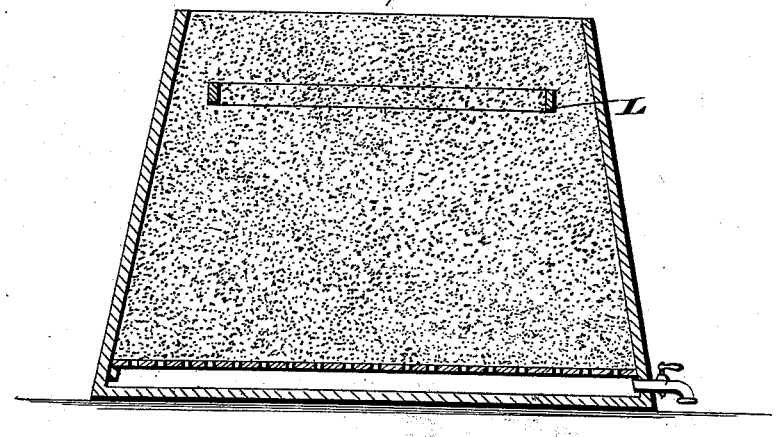
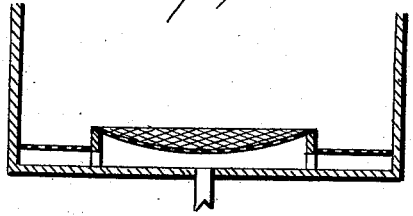 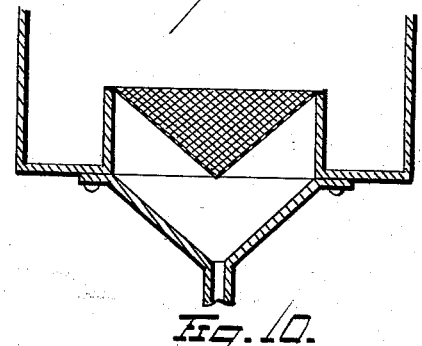
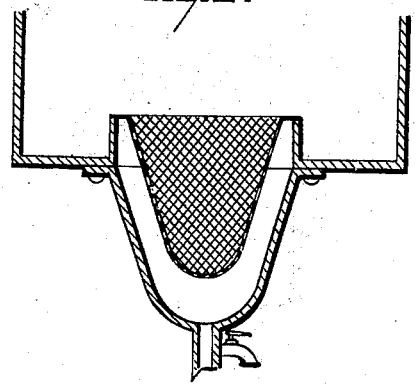 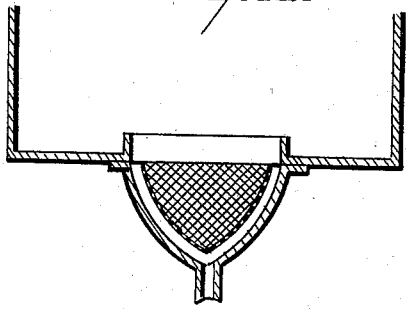
WITNESSES
A. W. Bright
F. O. McCleary
INVENTOR
Max Lansburgh.
By H. A. Seymour.
ATTORNEY

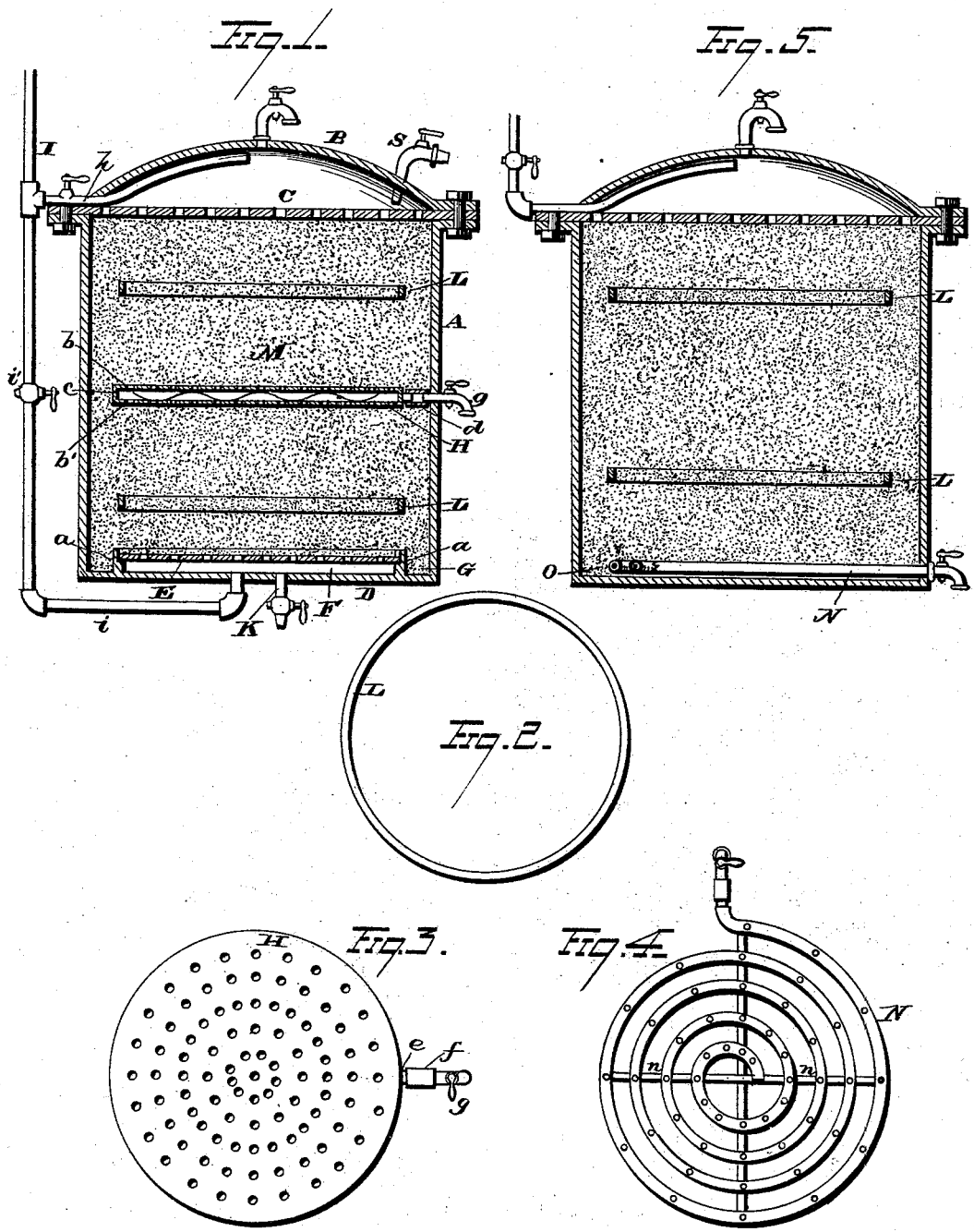

UNITED STATES PATENT OFFICE.

MAX LANSBURGH, OF NEW YORK, N. Y.

FILTERING APPARATUS.

SPECIFICATION forming part of Letters Patent No. 223,741, dated January 20, 1880.

Application filed December 9, 1879.

*To all whom it may concern:*

Be it known that I, MAX LANSBURGH, of New York, in the county of New York and State of New York, have invented certain new and useful Improvements in Filtering Apparatus; and I do hereby declare the following to be a full, clear, and exact description of the invention, such as will enable others skilled in the art to which it pertains to make and use it, reference being had to the accompanying drawings, which form part of this specification.

My invention relates to an apparatus for filtering liquids.

Heretofore great difficulty has been experienced in subjecting the liquid to be filtered to the equable clarifying action of the body of contained rectifying or filtering material in a filtering apparatus, especially when the liquid has been forced through the filtering material under pressure, for the reason that the liquid in its passage through the filtering apparatus will naturally pursue the path or course of least resistance, and hence a considerable portion of the liquid will flow along the walls of the filtering apparatus and operate to cut or form channels in the filtering medium, and thus escape from the apparatus in a partially-filtered state.

Letters Patent No. 111,001, granted to Louis Raecke, January 17, 1871, and reissued, No. 8,894, dated September 16, 1879, relate to a radical improvement on the then existing state of the art in apparatus for filtering liquids, as said apparatus was constructed to obviate the difficulty above set forth, and consisted, essentially, in interposing a flange between the perforated and foraminated exit of the filter and the sides thereof, thereby forming an annular chamber, which was packed with filtering material, thus causing the liquid to leave the wall of the filter—its easy and natural path—and flow inwardly toward the exit or discharge-openings, thus permeating and penetrating the intervening body of filtering material and escaping from the apparatus in a comparatively perfect state of filtration.

In the patented apparatus of Raecke, heretofore referred to, the liquid is allowed to flow downward along the walls of the apparatus throughout the greater portion of its length before it is caused, by the annular body of filtering medium, to take a radial path away from the walls of the filter through the filtering medium to the foraminated exit; and hence it may be said that almost sole reliance must be placed upon the annular body of packed filtering material in the bottom of the filter to insure the satisfactory filtration of that portion of the liquid that flows along down the walls of the filtering apparatus.

The object of my invention is to provide a filtering apparatus with means or accessories for forming tightly-packed and practically unyielding annular bodies of filtering material at any desired place or places in the filtering apparatus and against the inner surface of its walls or sides, whereby the liquid that will naturally flow along down the walls of the filtering vessel or apparatus will be caused to either flow inwardly and over said annular body of filtering material or downwardly through the same, and in either event subject the liquid to a continuous and active filtration throughout its entire path through the filtering-vessel, and prevent the formation of grooves or channels in the filtering medium located in contact with the walls of the filtering-vessel.

To this end my invention consists, essentially, in the combination, with a filtering-vessel packed with filtering material, of one or more rings formed independent of the filtering-vessel and wholly disconnected therefrom, said ring or rings being embedded in the filtering material, and thereby forming annular bodies or packings of filtering material between the wall of the filter and outer surfaces of the ring or rings, for preventing the liquid from flowing along down the walls of the receptacle of the filtering apparatus and cutting grooves or channels in the filtering material, and thereby escaping from the filter in a partially-filtered state.

My invention further consists in certain details of construction and combination of parts in a filtering apparatus, as will hereinafter be explained, and pointed out in the claims.

In the accompanying drawings, Figure 1 is a vertical section of a filtering apparatus embodying my invention. Fig. 2 shows the ring or hoop. Fig. 3 is a plan view of the perforated receptacle. Figs. 4, 5, 6, 7, 8, 9, 10 are modifications.

A represents a filtering-vessel, which may be constructed of any suitable material and of any desired size and form. B is a cover, secured to the top of vessel A in an air-tight manner, to allow the liquid to be filtered under pressure. C is a perforated plate located over the filtering-chamber, the outer edge of the plate being firmly secured between the cover and the top of vessel A.

The bottom D of vessel A is provided with an annular flange, $a$, within which is located the perforated plate E, thereby forming an open chamber, F, between the perforated plate E and bottom D of the filtering-vessel.

The annular flange $a$ is located any desired distance from the wall of the filtering-vessel, and serves to form an intervening annular chamber, G, which is packed with filtering material, as will hereinafter be described.

In the central portion of the filtering-vessel is placed a receptacle, H, formed of the perforated plates $b\ b'$ and periphery $c$, the latter having a discharge-opening, $d$, formed therein, and a socket or nipple, $e$, connected therewith, to which is secured one end of a flexible pipe or tubing, $f$, the opposite end of said pipe being secured to the end of a stop-cock or faucet, $g$.

I represents the liquid-supply pipe, having branch pipe $h$ leading to the top of the filtering-vessel, and branch pipe $i$ to the bottom thereof. Between the branch pipes $h$ and $i$ is placed a stop-cock, $i'$, to prevent the liquid from entering the lower portion of the filtering-vessel, if desired.

K is a discharge-pipe connected with the bottom of the filtering-vessel. The lower end of the filtering-vessel is first packed with filtering material, finely-pulverized charcoal ordinarily being used. At a suitable distance from the perforated plate E is inserted in the filtering material a ring or hoop, L, which may be made of copper or other suitable material. The filtering material is tightly packed on all sides of the ring, and at about the central portion of the vessel is placed the receptacle H, the filtering material being closely packed between the wall of the filter and the periphery of the receptacle. Above the receptacle may be placed another ring or hoop, L, and the filtering material tightly packed on all sides of the same. Thus the entire filtering-vessel is tightly packed with filtering material, and if it is desired to operate the filter in a double-acting manner the liquid is allowed to enter the vessel through its top and bottom, and flow toward the center of the vessel and enter the perforated receptacle H, and be discharged therefrom in a filtered state.

As heretofore stated, the liquid has a tendency to flow along the walls of the vessel and cut grooves or channels in the filtering medium, and thus escape in a partly unfiltered state; but this difficulty is obviated by the employment of the rings or hoops L, as they serve to form an annular space around the inner surface of the filter, which space is closely packed with filtering material; and owing to the lateral supporting-walls of said annular body of filtering material, formed by the wall of the filtering-vessel on the outer side and the outer surface of the ring or hoop on the inner side, the filtering material is prevented from yielding and the liquid prevented from cutting or forming channels or grooves along the side of the filtering-vessel. Thus the liquid, on its upward and downward passage to the central perforated receptacle, H, is subjected to practically perfect filtration, and as it approaches the receptacle H it meets with an annular body of filtering material tightly packed between the inner wall of the filter and the periphery of said receptacle, and thus is forced to take an inward course to the perforated top and bottom of receptacle H, through which the liquid flows in its filtered state, and escapes through the discharge-faucet connected therewith.

The flexible tube connecting the discharge-faucet and perforated receptacle H allows the latter to yield to any uneven expansion of the packing or filtering material M, and thus insures a perfectly tight discharge-conduit.

In the event that it is desired to use the filter in a single-acting manner, the lower branch supply-pipe is cut off by closing the stop-cock in the pipe, and the stop-cock connected with the receptacle H is also closed. Liquid then enters at the top of the filtering-vessel and flows downwardly to the bottom thereof, it being prevented from cutting grooves or channels in the filtering material next to the wall of the filter by reason of the annular bodies of filtering material interposed between the rings and the sides or wall of the filtering-vessel. It is caused to flow inwardly toward the center thereof by the annular body of filtering material packed between the flange and side of the vessel, and thus forced to penetrate and permeate the filtering medium interposed between the perforated plate at the bottom of the vessel and the side of the filter, whereby there is at all times insured a perfect filtration of the liquid that escapes through the discharge-outlet.

Fig. 4 represents a receptacle, N, that may be used in the central portion of the filter in lieu of receptacle H. Receptacle N consists in a coil of perforated pipe or tubing, the coils being braced by stays or braces $n$.

In Fig. 5 I have represented a single-acting filter provided with the rings L, two in number, and the coil of perforated pipe at the bottom, the outer coil serving as a flange to form an annular chamber, $o$, which is packed with filtering material, and thus the liquid is prevented from flowing along the walls of the vessel to the discharge-openings in the perforated pipe.

The rings or hoops L may be employed with good results in an ordinary leach-tub.

As represented in Fig. 6, instead of employing a flat perforated plate at the bottom of the filtering-vessel, I may use any of the different forms shown in Figs. 7, 8, 9, or 10.

I am aware that ledges have been attached to the inner surface of the filtering-vessel, as instanced in Letters Patent No. 101,544, granted to J. A. Thompson, dated April 5, 1870; but in such construction it is found impossible to tightly pack the filtering material beneath the ledges, and the result is the ledges thus secured to the inner walls of the filter simply form an extended path for the liquid as it flows along the walls of the filter, and do not operate to form an annular space within which the filtering material may be tightly packed, as in my invention; and hence I would have it understood that I make no claim to a ledge connected to the sides of a filtering-vessel, as such construction would defeat the object and result to be obtained by my improvement.

Any number of rings or hoops may be employed in the filtering-vessel as desired, and the ring or rings may be located in any portion of the vessel.

My improved filter may be used as a double rectifier or filter—as, for instance, in the case of high-wines, the cock governing the flow of liquor to the bottom of the filtering-vessel is closed, and liquor only admitted through the top of the vessel, and caused to flow through the filtering material in the upper portion of the vessel and be discharged from the discharge-cock connected with the central discharge-receptacle.

After the filtering material in the upper portion of the vessel has been used for a time, the stop-cock connected with the central discharge-receptacle may be closed and the liquor caused to flow to the discharge-opening in the bottom of the vessel, and thus insure most perfect results, or double rectification.

If desired, the operation of the filter may be reversed, and liquor admitted through the pipe attached to the central discharge-receptacle or forced under pressure into the perforated receptacle located in the central portion of the filtering-vessel, and from said receptacle the liquid will then flow in opposite directions and be discharged from the top and bottom of the filtering-vessel, or it may be discharged from either the top or bottom of the filtering-vessel.

In the cover of the filter I place a siphon-cock, S, the inner end of which extends down close to the upper perforated plate. When it is desired to empty the filtering-vessel for any purpose, the liquor remaining therein after the pressure has been removed may be quickly drawn off by attaching a tube to the outer end of the siphon-cock S, and open the latter, thus forming a siphon for removing the liquor from the upper portion of the filter.

Having fully described my invention, what I claim as new, and desire to secure by Letters Patent, is—

1. The combination, with a filtering-vessel packed with filtering material, of one or more rings made independent of the filtering-vessel, and disconnected therefrom and embedded in the filtering material, thereby forming one or more annular packings of filtering material in contact with the wall of the vessel, substantially as set forth.

2. In a filtering apparatus, the combination, with a filtering-vessel, of a discharge-receptacle located within the filtering-vessel, said receptacle provided with perforated top and bottom and an imperforate periphery, the latter being of less diameter than the filtering-vessel, to form an annular intervening packing of filtering material, substantially as set forth.

3. In a filtering apparatus, the combination, with a filtering-vessel, of a discharge-receptacle located within the filtering medium or material, said receptacle provided with perforated top and bottom and connected with a discharge-faucet by means of a flexible pipe or tubing, substantially as set forth.

4. In a filtering apparatus, the combination, with a filtering-vessel provided with a flange located between the perforated discharge-plate or outlet, thereby forming an annular chamber for packing, of one or more rings or hoops embedded in the packing material at any desired point or points in the filtering-vessel, substantially as set forth.

5. In a filtering apparatus, the combination, with a perforated discharge-receptacle embedded in the filtering material, of one or more rings embedded in the filtering material and disconnected from the vessel, said rings forming annular bodies of filtering material to prevent the cutting of grooves or channels by the liquid, substantially as set forth.

In testimony that I claim the foregoing I have hereunto set my hand this 26th day of November, 1879.

MAX LANSBURGH.

Witnesses:
F. O. McCleary,
T. B. Hall.